United States Patent [19]

Leon

[11] Patent Number: 5,324,147
[45] Date of Patent: Jun. 28, 1994

[54] FASTENING ATTACHMENT FITTING OF A PART PROVIDED WITH A ROD ONTO A WALL

[75] Inventor: Jean-Pierre R. Leon, Houilles, France

[73] Assignee: Rapid S.A., France

[21] Appl. No.: 980,651

[22] Filed: Nov. 24, 1992

[30] Foreign Application Priority Data

Nov. 25, 1991 [FR] France ................. 91 14503

[51] Int. Cl.⁵ ............................. F16B 37/04
[52] U.S. Cl. ........................ 411/182; 411/436
[58] Field of Search ............. 411/34, 182, 59, 172, 411/173, 174, 175, 37, 38, 32, 55, 436, 437

[56] References Cited

U.S. PATENT DOCUMENTS

| | | | |
|---|---|---|---|
| 2,150,080 | 3/1939 | Rawlings | 411/37 |
| 2,279,903 | 4/1942 | Johnson | 411/173 |
| 2,525,736 | 10/1950 | Taylor | 411/34 |
| 2,913,950 | 11/1959 | Tinnerman . | |
| 3,426,817 | 2/1969 | Parkin et al. . | |
| 3,785,241 | 1/1974 | Fischer | 411/38 |
| 3,937,122 | 2/1976 | Riedel | 411/34 |
| 4,776,737 | 10/1988 | Wollar | 411/55 X |
| 5,036,674 | 8/1991 | Chang . | |
| 5,120,169 | 6/1992 | Russo | 411/38 |

FOREIGN PATENT DOCUMENTS

| | | | |
|---|---|---|---|
| 2905801 | 8/1979 | Fed. Rep. of Germany | 411/182 |
| 907899 | 10/1962 | United Kingdom . | |
| 1505595 | 3/1978 | United Kingdom | 411/38 |

*Primary Examiner*—Rodney M. Lindsey
*Attorney, Agent, or Firm*—Steinberg, Raskin & Davidson

[57] ABSTRACT

An attachment fitting for the fastening of a part provided with a rod onto a wall, the attachment fitting having the shape of a shank of plastics material comprising a base forming a cup for receiving a washer with claws whereas above the base are provided elastically deformable tongues allowing to clip the shank into the aperture of a wall while positively retaining the washer within the cup of the base, the attachment fitting being applicable in particular to the fastening of a shield onto a metal sheet belonging to the body of an automotive vehicle.

10 Claims, 1 Drawing Sheet

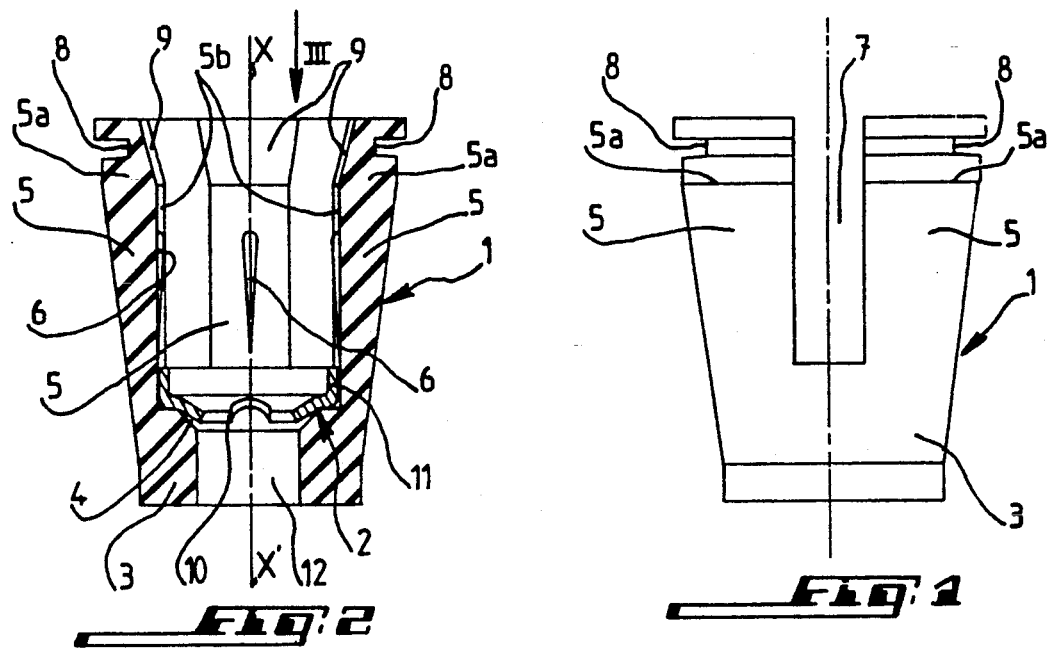
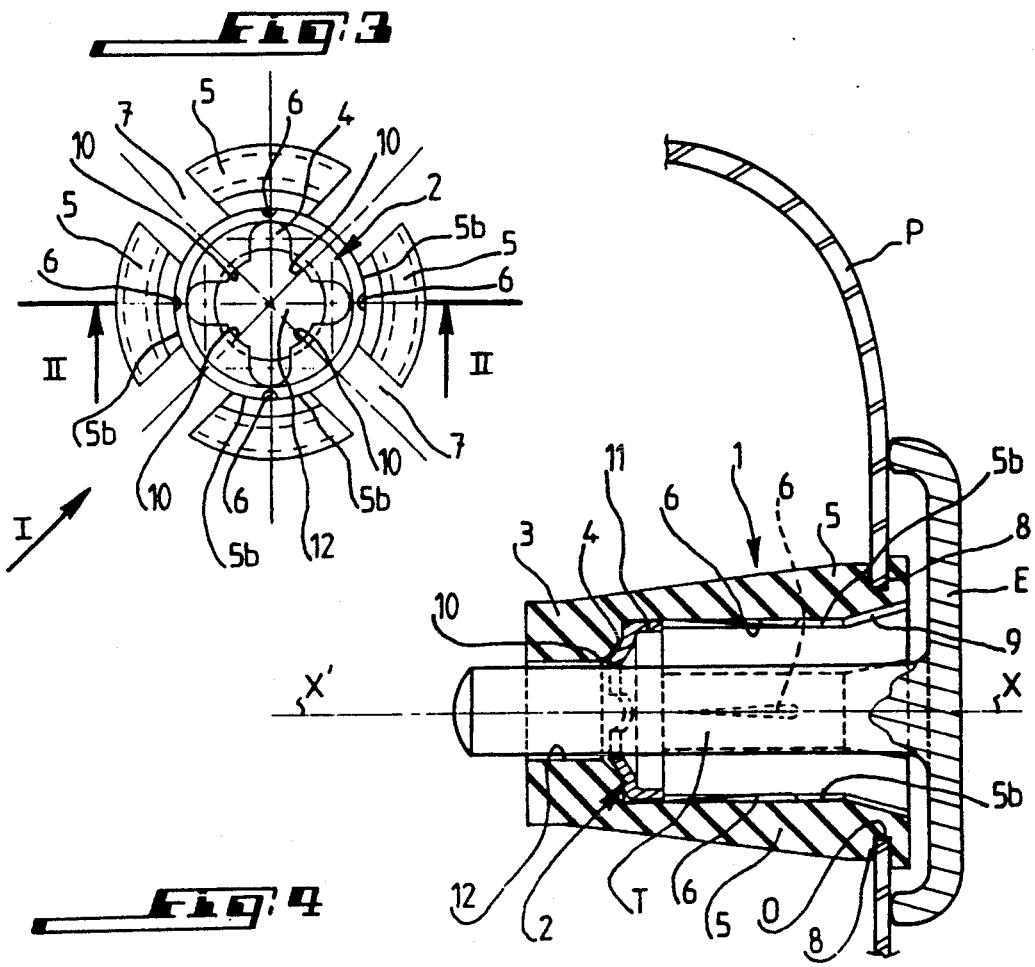

FASTENING ATTACHMENT FITTING OF A PART PROVIDED WITH A ROD ONTO A WALL

BACKGROUND OF THE INVENTION

The present invention relates essentially to a device for fastening any part whatsoever provided with a rod or pin to a wall.

When it is desired to secure a part such for instance as a plate or a shield onto a wall such as a metal sheet forming a part of the body of a vehicle, the rod or pin initially solid with the part is passed through an aperture formed in the metal sheet and on the other side of the metal sheet there is proceeded with the fastening by means of any system whatsoever such as a nut, a clip or the like.

Such a fastening exhibits a number of inconveniences. At first in order to proceed with a fastening, both sides or faces of the metal sheet should be accessible. Moreover the fastening requires some skilfulness from the operator and it may not be carried out very quickly in view in particular of the groping handling steps it is necessary to do. To this should be added the fact that such a fastening gives rise to corrosion problems due to the metal members in direct contact with each other.

OBJECTS AND SUMMARY OF THE INVENTION

Therefore the object of the present invention is to cope in particular with the inconveniences referred to hereinabove.

For that purpose the subject matter of the invention is a fastening attachment fitting onto a wall and onto one side thereof of a part such for example as a shield provided with a rod or pin extending through an opening formed in the wall and co-operating with a fastening element on the other side of the wall, characterized in that the fastening element is accommodated in the bottom of an internally hollow, elastically deformable and elongated member which may be extended through by the rod and clipped with its end opposite to the said bottom into the opening of the wall to allow the fastening of the part from one single side of the wall and at a place relatively remote therefrom.

According to another characterizing feature of this attachment fitting the aforesaid member exhibits substantially the shape of a shank comprising a base forming a cup for receiving the fastening element and above this base elastically deformable blades or tongues.

These blades or tongues have thicknesses increasing from the base up substantially to their free ends so as to positively retain the fastening element onto the base once the shank has been clipped into the aperture of the wall.

It should further be added here that the inner face of each blade or tongue comprises at least one rib extending along substantially the center line axis of the shank so that the fastening element will remain positively held onto the base when the shank is at rest, i.e. non clipped into the aperture of the wall.

According to still another characterizing feature of the invention, towards their free ends, the said blades or tongues comprise each one an external groove and an internal chamfer or bevel.

The fastening element housed within the cup of the aforesaid base consists of a washer with claws capable of hooking themselves onto the rod or pin of the part.

It should further be specified here that the periphery of the washer forms a flange with a small height.

According to still a further characterizing feature of this attachment fitting, the washer or cup for receiving the fastening element onto the base is provided with an axial aperture which is either opening or not opening outwards.

BRIEF DESCRIPTION OF THE DRAWINGS

The invention will be better understood and further objects, characterizing features, advantages and details thereof will appear better as the following explanatory description proceeds with reference to the accompanying diagrammatic drawings given by way of non-limiting example only illustrating a presently preferred specific embodiment of the invention and in which:

FIG. 1 is an elevational outside view of an attachment fitting according to the invention as seen in the direction of the arrow I of FIG. 3;

FIG. 2 is a view in axial section of this attachment fitting taken upon the line II—II of FIG. 3;

FIG. 3 is a top view of the attachment fitting as seen in the direction of the arrow III of FIG. 2; and FIG. 4 is a view in axial section of the attachment fitting in the position clipped onto a wall and owing to which is fastened a part provided with a rod or pin and forming for instance a shield to be secured to the body of an automotive vehicle.

DETAILED DESCRIPTION OF THE INVENTION

Referring to the drawings, there is seen that a fastening attachment fitting according to this invention and according to an examplary embodiment consists essentially of an internally hollow elongated member of plastics material exhibiting substantially the shape of a shank 1 in the bottom of which is accommodated a fastening element 2 which preferably is metallic.

As well seen in FIG. 4, the shank 1 may be clipped with its open upper portion into the aperture O of a wall P onto which has to be fastened any part whatsoever such for instance as a shield E provided with a rod or pin adapted to enter the shank 1. The wall P may for instance be a metal sheet belonging to the body of an automotive vehicle.

The shank 1 comprises a base 3 forming at its top portion a cup 4 receiving the fastening element 2. Above the base 3 and integrally therewith are provided radially elastically deformable tongues or blades 5, these tongues being in a number of four according to the examplary embodiment shown as well seen on FIG. 3.

As is clearly apparent from FIGS. 2 and 4, the tongues 5 have thicknesses increasing from the base 3 where they have their roots up substantially to their free ends 5a. The function or purpose of the increasing thicknesses of the tongues will be explained hereinafter in connection with the operation.

Moreover as well seen on FIGS. 2 to 4, the inner face 5b of each tongue 5 comprises a rib 6 which is substantially co-extensive with the axis X—X' of the shank 1. The function of these ribs 6 will be explained later in connection with the operation and the mounting of the attachment fitting.

The tongues 5 separated from each other by spacings or gaps 7 of some width comprise each one at their free ends 5a an outer groove 8 allowing the shank 1 to be clipped on the wall P. At their free ends 5a, the tongues 5 further comprise an inner chamfer or bevel designated with 9 on FIGS. 2 and 4.

The fastening element 2 housed at the bottom of the shank 1 in the cup 4 formed in the base 3 consists according to the examplary embodiment shown of a washer with claws 10 adapted to co-operate through hooking with the rod or pin T of the part or shield E when it has been passed through the said washer.

It is further seen on FIGS. 3 and 4 that the fastening element or washer 2 comprises at its periphery a flange 11 of small height which in a way improves the seating of the washer 2 within the cup 4 of the base 3.

This base 3 together with the cup 4 is provided with an axial thoroughfare opening 12 as well seen in particular on FIGS. 2 and 4.

This axial aperture 12 may however without departing from the scope of the invention be not opening outwards, i.e. be closed while nevertheless extending over some length in the axial direction to allow the rod or pin T of the part E to be received when the said rod has been passed through and is hooked onto the washer 2 accommodated within the cup 4 of the base 3.

Now for a better understanding of the invention, the operation of the attachment fitting which has just been described as well as the fastening of the part or shield E onto the wall P with the assistance of this attachment fitting will be described hereinafter.

It should at first be specified that when the shank-like attachment fitting 1 is at rest, i.e. not yet clipped onto the wall P, the washer 2 may not escape from the cup 4 of the base 3 owing to the ribs 6 on the tongues 5. The shank 1-washer 2 assembly therefore remains unitary.

The shank 1 is then inserted into the aperture 0 of the wall P and this through radial deformation of the tongues 5 towards the axis X—X' until the groove 8 of the said tongues is clipping itself into the aperture 0 as clearly seen on FIG. 4.

The rod T of the shield E is then force-driven through the metal washer 2, the claws 10 of this washer hooking themselves onto the said rod so that the shield E will be firmly applied and secured onto the wall P and this without any possibility of wrenching or tearing away owing to the claws 10 of the washer 2. It is important to note here that the washer 2 itself may not leave or move out of the cup 4 of the base 3 under the action of a pull exerted upon the shield E hence upon the rod T in view not only of the ribs 6 but especially of the thicknesses 3 of the tongues 5 increasing from the base 3 up to their free ends 5a. In other words in the clipped position onto the wall P, the shank 1 has an internal opening or bore tapering in narrowing relationship from the cup 4 of the base 3 to the free ends of the elastic tongues 5 thereby performing in a way the locking of the washer 2 into the cup 4 of the base 3, which locking would reinforce itself in the case where washer 2 would tend to escape from or move out of the cup 4.

On FIG. 4 is seen that the free end of the rod T opens outwards of the shank 1 after extending through the axial through-hole 12 provided in the base 3. As however previously explained, the rod T may have such a length that while entering the opening 12 it may not extend therethrough to project outwards therefrom so that the said opening 12 may be closed, the metal washer 2 being then housed in a fluid-tight cage constituted by the shank 1.

There has therefore been provided according to the invention a fastening attachment fitting which may be secured as by clipping onto the wall P from one single side or from one single face thereof, which therefore allows a part or shield E fitted with a rod T to be fastened from one single side of the wall P and which not only provides a fastening by the washer 2 at a place or spot relatively remote from the said wall P but advantageously avoids any corrosion problem which is a frequent phenomenon with the fastenings carried out on the automotive vehicles.

The invention is not at all limited to the embodiment described and shown which has been given by way of example only.

Thus the part E to be fastened may have any shape whatsoever and likewise the shank 1 may be made from any elastomeric material whatsoever and the washer 2 may assume any suitable shape whatsoever to provide for the fastening of the part E.

This means that the invention comprises all the technical equivalents of the means described as well as their combinations if the latter are carried out according to its gist and within the scope of the appended claims.

What is claimed is:

1. An attachment fitting for fastening a part onto a wall from one side thereof in which a rod on the part extends through an aperture in the wall, comprising
    an internally hollow and elastically deformable elongated member having substantially the shape of a shank, said shank including a base forming a cup in an interior of said shank,
    elastically deformable tongues extending from said base and having free ends contacting the aperture of said wall, said tongues having an increasing thickness from said base to said free ends, each of said tongues including at least one internal rib extending substantially parallel to a center line axis of the shank, and
    a washer having a flange and housed within said cup, said washer including claws for hooking the rod, said ribs and the increasing thicknesses of said tongues preventing said washer from moving out of said cup and said shank having an internal bore tapering inward from said cup to said free ends of said tongues to thereby lock said washer into said cup.

2. An attachment fitting according to claim 1, wherein said washer has an axial aperture opening outward from said shank.

3. The attachment fitting of claim 1, wherein said cup has an axial aperture opening outward from said shank.

4. An attachment fitting according to claim 1, wherein towards their free ends, the tongues comprise each one an external groove and an internal bevel.

5. The attachment fitting of claim 4, wherein said external groove of said tongues are arranged to enclose the wall and secure the attachment fitting to the wall.

6. An attachment fitting for fastening a rod of a part onto a wall through an aperture formed in the wall, comprising
    an internally hollow, elongated member constituting a shank, said shank including a base forming a cup in an interior of said shank for receiving the rod,
    elastically deformable tongues extending from said base to a first end of said tongues, said tongues having a substantially increasing thickness from said base to said first end, said tongues including at least one internal rib, and
    a washer housed within said cup and including claws for hooking the rod, said ribs and the increasing thicknesses of said tongues preventing said washer from moving out of said cup and said shank having an internal bore tapering inward from said cup to said first ends of said tongues to thereby lock said washer into said cup.

7. The attachment fitting of claim 6, wherein said tongues further comprise means to clip the attachment fitting to the wall.

8. The attachment fitting of claim 7, wherein said means comprise a groove arranged in an outer surface of said tongues in proximity to said first ends thereof, said outer groove being arranged to envelop the aperture of said wall and secure the attachment fitting to the wall.

9. The attachment fitting of claim 6, wherein said at least one internal rib of said tongues extends substantially parallel to a center line axis of said shank.

10. The attachment fitting of claim 6, wherein said washer has a flange extending in a direction of said first end of said tongues.

* * * * *